April 22, 1952     B. V. ELLIOTT     2,594,000
ELECTRIC LINE-UP CLAMP
Filed March 19, 1948     7 Sheets-Sheet 1

INVENTOR.
BERNARD V. ELLIOTT
BY
ATTORNEY

April 22, 1952     B. V. ELLIOTT     2,594,000
ELECTRIC LINE-UP CLAMP Filed March 19, 1948     7 Sheets-Sheet 4

*Fig. 4.*

Inventor
BERNARD V. ELLIOTT

By Ben Cohen
ATTORNEY

April 22, 1952     B. V. ELLIOTT     2,594,000
ELECTRIC LINE-UP CLAMP Filed March 19, 1948     7 Sheets-Sheet 6

Inventor
BERNARD V. ELLIOTT
By Bill Cohen
ATTORNEY

April 22, 1952     B. V. ELLIOTT     2,594,000
ELECTRIC LINE-UP CLAMP Filed March 19, 1948     7 Sheets-Sheet 7

Inventor
BERNARD V. ELLIOTT
By Ben Cohen
ATTORNEY

Patented Apr. 22, 1952

2,594,000

UNITED STATES PATENT OFFICE 2,594,000

ELECTRIC LINE-UP CLAMP

Bernard V. Elliott, Dewey, Okla., assignor to H. C. Price Co., Bartlesville, Okla., a corporation of California Application March 19, 1948, Serial No. 15,912

6 Claims. (Cl. 113—103)

This invention relates to an improved machine in the nature of an internal line-up clamp for aligning the adjacent free ends of pipe line sections for a subsequent welding operation. The present invention constitutes an improvement over my prior Patent No. 2,408,255 and copending application Serial Number 760,242, filed on July 11, 1947, now abandoned.

My prior patent, referred to above, discloses the general concept of a combined clamping ring and jack mounted on a common supporting base for holding two adjacent pipe sections in proper relationship whereby the two sections can be welded together. The provision of the jack assures a proper positioning of the clamping ring which in turn engages the marginal inner edges of the two adjacent pipe sections and holds the edges in proper position for the welding operation. The specific means for operating the jack and the clamping means are manually operated.

In my copending application referred to above, I have shown and described an internal line-up clamp having an electrically operated propelling means for propelling the clamp through succeeding pipe sections as they are laid and welded, said means being controllable from a point remote from the clamp. As shown and described in said application, the expanding means for the clamp is in the form of a mechanically operated means employing hand power.

In laying pipe lines over hilly country, the length of the pipe sections increase in length varying from forty feet to one hundred and fifty feet in length, the longer sections being necessary on steep inclines. Therefore, it is very desirable to use a motor operated propelling device for the clamp thereby doing away with hand labor of pulling the heavy clamp through long lengths of pipe particularly when working up a steep incline.

Further difficulties arise when working under the conditions described in the preceding paragraph with respect to the use of the hand operated expanding means described in my copending application. The minimum length of the hand crank would have to be forty feet for the shortest pipe section and one hundred and fifty feet for the longest pipe section. It is extremely difficult to crank the forty foot crank and it would be next to impossible to crank the one hundred and fifty foot crank by hand power.

I have solved this problem by providing an electrically operated motor for expanding the clamp, said motor being operable from a remote point in the same manner as the electrically operated propelling means. By using electric power for expanding the clamp, a great deal more power is obtained than by hand power thereby enabling the clamp to round out and line up the pipe joints with more efficiency and in less time. Since an important function of a line-up clamp is to straighten out the irregularities occurring in the ends of pipe sections, the hand powered clamp is difficult to operate when laying pipe sections having somewhat thicker walls. The all electric clamp has sufficient power to expand the ends of the pipe regardless of irregularities or thickness of the wall.

A further feature of the present invention resides in the provision of an improved type of stabbing shield for giving more protection in the field from the stabbing operation when the new pipe joint is stabbed over the clamp.

Other advantages and features of the present invention will be readily apparent from the following detailed description of the invention taken in connection with the accompanied drawings, wherein:

Figure 1:
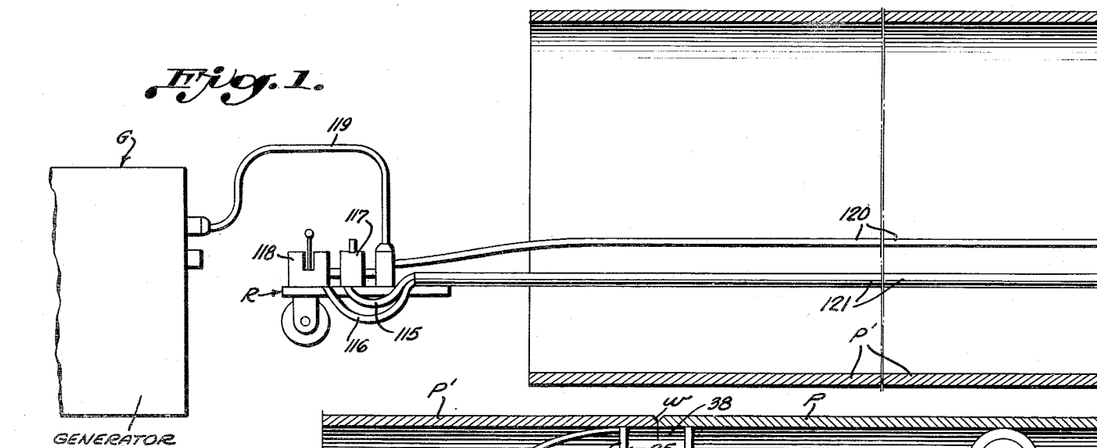
Figures 1 and 1a combine to form a side elevational view of the novel line-up clamp operatively positioned within a pair of abutting pipe sections in longitudinal section.
Figure 1A:
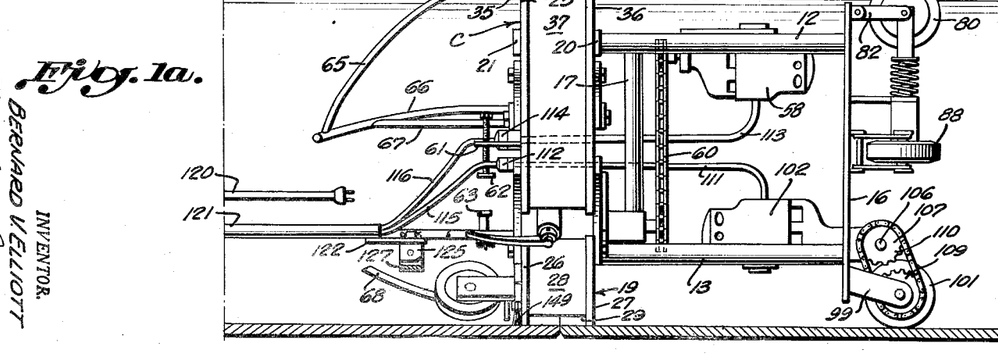

Referring to the drawings in detail wherein like reference characters refer to like parts throughout the several views, and particularly to Figures 1 and 1a, the reference letters P and P designate a pair of abutting pipe sections adapted to be aligned and held in proper position by the novel internal line-up clamp C forming the subject matter of the present invention, whereby a peripheral weld may be applied to unite said pipe sections. Section P will be hereafter referred to as the main back line and P as the section being stabbed and lined up. Reference character G designates the generator in the form of a mobile unit for supplying the power to the motors mounted on the clamp C and reference character R the remote control panel for operating the motors.

Figure 2:
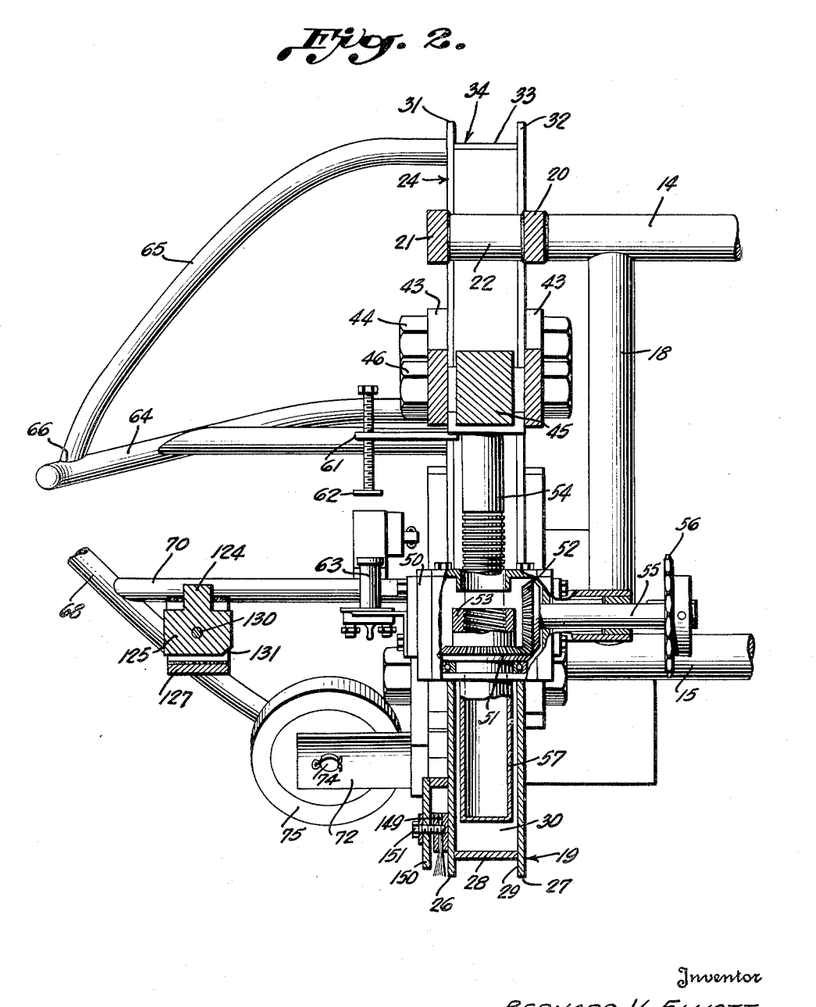
Figure 2 is a vertical sectional view through the rear portion of the clamp showing the ring expanding means.
Figure 3:
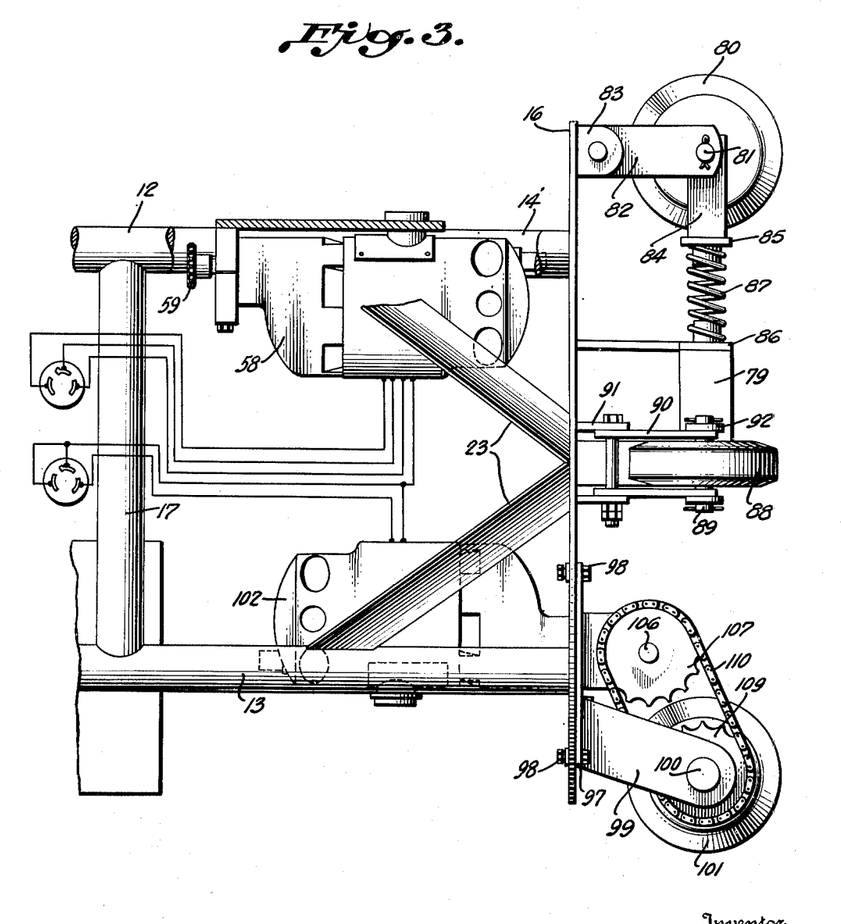
Figure 3 is a vertical sectional view through the front end of the clamp showing the propelling means.

Referring to Figures 1a, 2 and 3, the improved line-up clamp of the present invention comprises an open framework formed of four horizontally spaced rods 12, 13, 14 and 15, welded or otherwise suitably secured to a circular plate 16. The rods are suitably spaced around the plate to form an open box-like supporting frame. Vertical rods 17 and 18 are welded to each pair of vertically aligned horizontal rods adjacent the opposite ends of these rods to form a more rigid framework. The extreme ends of the lower pair of horizontal rods 13 and 15 are welded or otherwise secured to the stationary section 19 of the expanding ring of the clamp. The extreme ends of the upper pair or horizontal rods 12 and 14 are secured to a cross plate 20 as seen in detail in Figure 11. Cross plate 20 carries a second cross plate 21 properly spaced therefrom by a short section of rod 22. The purpose of this second cross plate will appear as the description proceeds. Reinforcing angle irons 23 between the horizontal rods and the plate member 16 add to the rigidity of the frame.

Figure 4:
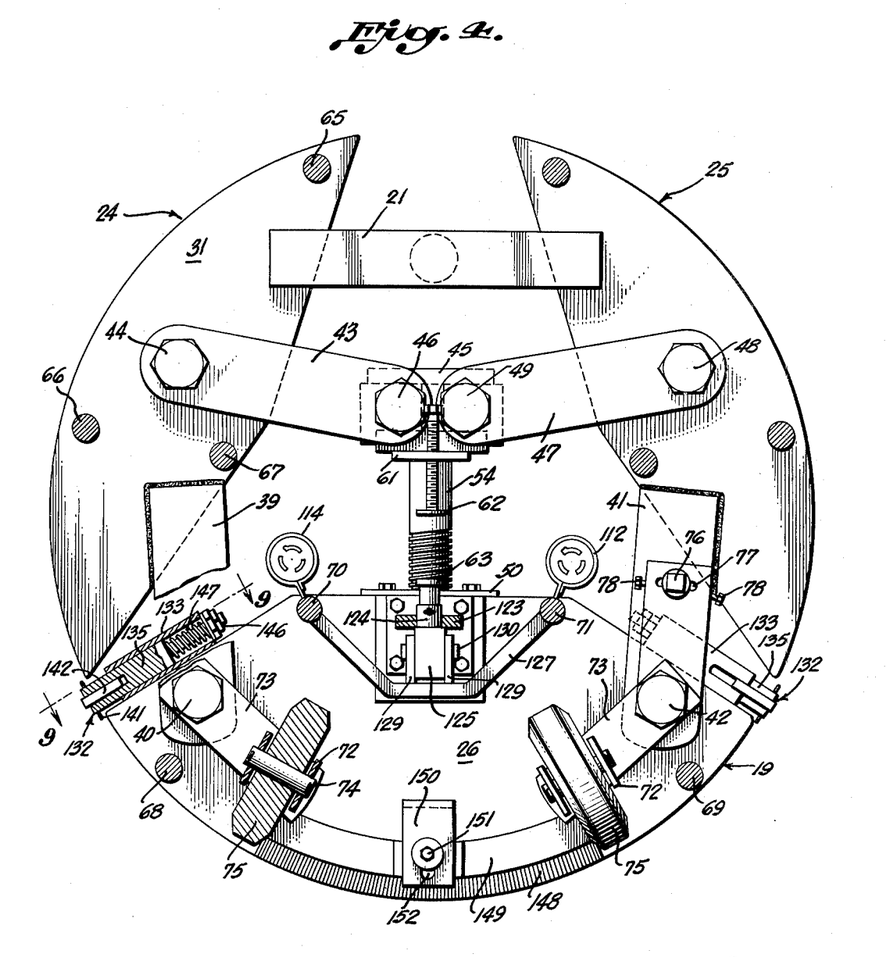
Figure 4 is an elevational view of the rear face of the clamp.

At the forward or left hand end of the frame, the numeral 19 indicates the stationary part of the expanding ring mechanism. As seen in Figure 4, the ring mechanism comprises the three main sections 19, 24 and 25 shaped to form a circular ring member so constructed and arranged as to expand and contract within proper limits. Each section comprises a pair of spaced plates secured together by a spacer plate extending inwardly a slight distance from the circumferential edges of the plates. Thus, section 19 comprises the two spaced plates 26 and 27 joined by the spacer member 28 forming thereby an outer groove 29 and an inner hollow space 30. Section 24 comprises a pair of plate members 31 and 32 joined by a spacer member 33 to form outer groove 34. Section 25 comprises a pair of plate members 35 and 36 joined by a spacer member 37 to form a groove 38.

As seen in Figure 4, section 24 is pivotally supported by section 19 by means of a plate 39 welded to section 24 and rotatably secured to section 19 by a pivot bolt 40. A similar plate 41 is welded to section 25 and rotatably secured to section 19 by a pivot bolt 42. A pair of expander links 43, one on each face of section 24 are pivotally secured to section 24 by a pin 44 and to the cross-head 45 by a pin 46. A similar pair of expander links 47 are secured to section 25 by a pin 48 and to the cross-head 45 by a pin 49. It will be readily apparent from this description that downward movement of the cross-head 45 will move sections 24 and 25 inwardly and will cause the ring to contract. Upward movement of the cross-head will move the sections outwardly causing the ring to expand.

The jack assembly for raising and lowering the cross-head 45 is best seen in Figure 2. It comprises a housing 50 within which a pair of cooperating bevel gears 51 and 52 are supported by suitable anti-friction bearings. The gear 51 is provided with a threaded member 53 for receiving the lower threaded end of jack member 54 carried by cross-head 45. A horizontal rod 55 has one end secured to the gear 52 and has a sprocket gear 56 suitably attached to its other end. A housing 57 is mounted at the lower side of housing 50 to receive the jack member 54 in its lower travel. As seen in Figure 1a, the motor 58 for expanding and contracting the expander ring is suitably attached to the upper bars 12 and 14 of the framework in such position that its sprocket gear 59 overlies the sprocket gear 56. A sprocket chain 60 connects the two sprocket gears.

The motor 58 is preferably a 110 volt reversable motor and derives its power from the mobile generator unit G. Suitable means may be provided to prevent over-running of the motor. It consists of a bracket 61 carried by the cross-head 45, in its vertical movement. The bracket has a depending threaded bolt 62 adapted to strike against the stop 63 mounted on the housing 50, at the desired lowest point of movement of the cross-head. It will be noted that the bolt member 62 may be adjusted to any desired position by merely rotating the member.

In my prior application, previously referred to, I have disclosed a specific arrangement of guides or stabbing shields. In the present case, I have shown an improved stabbing shield arrangement which provides for ease and speed of pipe swabbing at the same time increasing the strength and lightness of the shield. The shield resembles the front end of a bullet and includes an open framework formed of curved bar members suitably welded together. Thus, referring to Figure 2, one of the stabbing shields is shown mounted on one of the main sections 24. It consists of a pair of inwardly curved spaced bars 64 and 65 suitably welded to each other at 66 and to the main section 24 as seen in Figure 4. A reinforcing rod 67 also connects rod 64 to the section 24 for increased rigidity and strength. A similar shield is provided for the movable ring section 25. The lower stationary ring section 26 includes a pair of spaced curved rods 68, 69 and reinforcing rods 70 and 71.

Means for properly positioning the present machine within a pipe section in order that the machine may be propelled through the pipe sections will now be described. At the forward end of the machine a pair of heavy duty rollers are supported on the stationary ring section 26. The two units are identical and a description of one will describe both. Referring to the right hand part of Figure 4, the unit comprises a supporting bracket 72 which is welded or otherwise suitably secured to an angular plate 73, the bracket carrying a pin 74 upon which roller 75 is mounted. The plate 73 has an opening at its angular portion and is mounted on pivot bolt 42. The upper part of the angular plate is secured to plate 41 by means of a pin 76 passing through the plate 41 and a slotted portion 77 in the angular plate. A pair of adjusting bolts 78 are provided for varying the angular position of plate 73. It will be apparent that adjusting the position of plate 73 will provide for adjustment of the roller 75.

Figure 5:
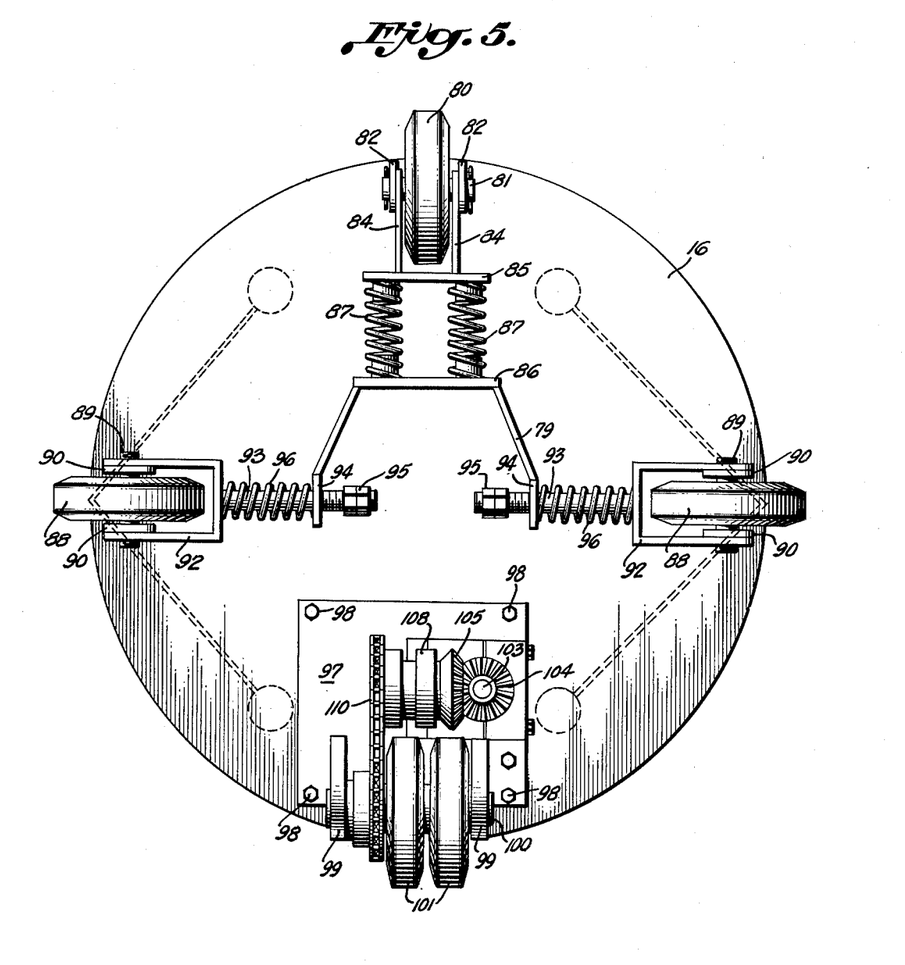
Figure 5 is a similar view of the front face of the clamp.

At the rear end of the machine, I provide four sets of rollers. As seen in Figure 5, the upper three rollers serve as means for centering the machine within a pipe section and also serve as a frictional brake to limit the speed of travel of the machine in hilly country. The lower set of rollers constitute the propelling rollers and will be described in detail later on in the specification.

As seen in Figures 3 and 5, a central frame member 79 is welded or otherwise suitably secured centrally of the rear plate 16. The top roller 80 is mounted on a pin 81 carried by arms 82, which in turn are pivoted to bracket member 83, secured to the rear face of plate 16. Also connected to the pin 81 are the two arms 84 connected to the cross plate 85. The cross plate 85 is resiliently secured to the top plate 86 of frame member 79 by springs 87 which normally urge the roller 80 outwardly.

The side set of rollers are the same and a description of one will also describe the other. Each roller 88 is mounted on a pin 89 carried by arms 90 which are pivoted to bracket member 91 which is secured to the rear face of plate 16. A U-shaped member 92 has its arms mounted on pin 89 and a bolt member 93 secured to its connecting arm portion. The threaded bolt member 93 passes through arm 94 of the frame member 79 and is held thereon by nuts 95. A spring 96 is interposed between the arm 94 and the U member for urging the roller outwardly. The tension of the spring is controlled by the nuts 95.

The propelling mechanism which forms an important feature of the present invention is shown in Figures 3 and 5. It comprises of a supporting plate 97, bolted to the rear plate 16 by suitable bolts 98 and carries a pair of rigid bracket arms 99. The bracket arms support the axle 100 upon which the propelling rollers 101 are mounted. A suitable electric motor 102 is mounted on the frame of the machine rearwardly of the plate 16 and the plate 16 and supporting plate 97 is provided with a suitable opening through which the motor shaft 103 extends. The motor shaft has mounted thereon a bevel gear 104, cooperating with a bevel gear 105 mounted on horizontal shaft 106. A sprocket gear 107 is mounted at the opposite end of the shaft 106, and numeral 108 designates a reduction gear between gears 105 and 107. A sprocket gear 109 is mounted on axle 100 and is connected to gear 107 by a sprocket chain 110.

Figure 6:
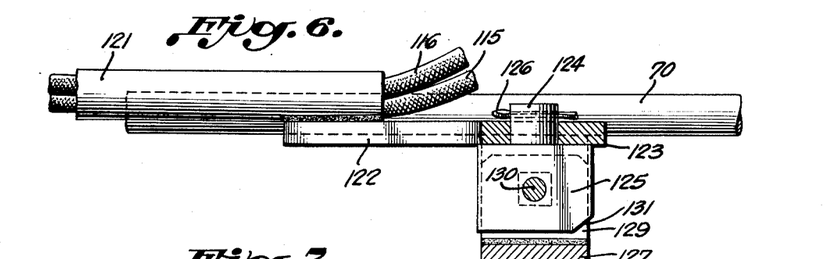
Figure 6 is an enlarged detail view of the connecting means for the conduit pipe and is taken on the line 6—6 of Figure 7.
Figure 7:
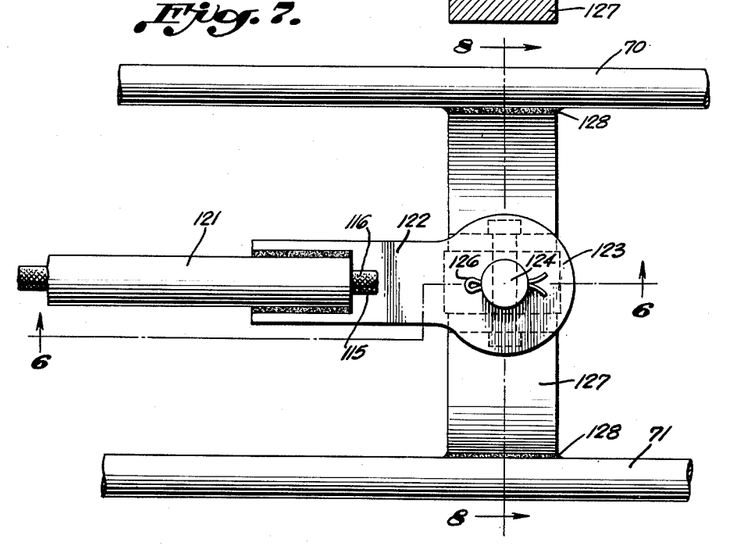
Figure 7 is a top plan view thereof.
Figure 8:
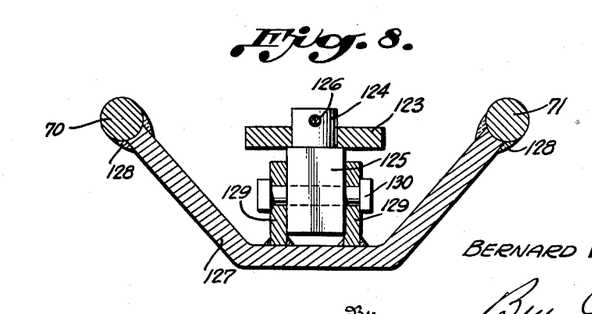
Figure 8 is a cross-sectional view taken on the line 8—8 of Figure 7.

Current is supplied to motor 102 through cable 111 connecting the motor to the front end of the machine at socket 112. A similar cable 113 connects the motor 58 to the front of the machine at socket 114. Removably connected to each of these sockets are two long cables 115, 116 which in turn are connected to the remote control panel R. The cable 115 is connected up to switch 117 for operating the propelling motor and the cable 116 is connected to the two way switch 118 for expanding or retracting the clamp. The remote control panel is connected to the generator G by means of a short cable 119 used to operate the expanding motor 58, and the long cable member 120 is plugged into the generator when the clamp is being propelled through the pipe. The cables 115 and 116 are carried within a pipe 121 which is secured to the clamp and the panel board for ease of operation. The pipe 121 is detachably secured to the clamp in a manner to permit movement thereof with respect to the clamp and will be described as follows:

Referring to Figures 6, 7 and 8 one end of the pipe has welded thereto a plate 122 terminating in a rounded portion 123. The rounded portion 123 is provided with an opening to receive the vertical pin 124 mounted on a block 125. A cotter pin 126 retains the plate on the pin 124 and permits the plate to rotate about the pin. The block is mounted to permit slight rotation of the pipe 121 in a vertical plane. A supporting strap 127 has its ends welded to the reinforcing rods 70 and 71 as indicated at 128 and carries a pair of upstanding plates 129. The block 125 is mounted between these two plates and rotates on pin member 130 passing through the block and the plates 129. One lower edge of the block 125 is chamfered at 131 to permit raising of the opposite end of pipe 121 while block 125 is being rotated about pin 130.

In my prior application I have provided means for spacing and aligning the clamp vertically with respect to the free edge of the fixed pipe section so as to accurately position one half of the U-member, or one leg thereof, within the fixed pipe section, leaving the other half thereof extending outwardly free to grip and support the free end of the pipe section to be joined to said fixed section. Said means is so constructed as to abut the free end of the fixed pipe section to limit the movement of the clamp within the fixed pipe section, thereby properly positioning the clamp within said fixed section. Said means are also adapted to be readily retracted during the stabbing operation. In the present machine I have disclosed a specifically different arrangement for accomplishing the same broad result. These means comprise a pair of stop members generally indicated by the numeral 132, shown specifically in Figures 9 and 10. Each stop consists of a hollow tube 133, open at both ends and provided at the upper end with a slotted portion 134. Each tube is welded to the stationary section 26 at each side of the section between said section and the movable sections of the clamp. Receivable within the tube 133 is a rod member 135 having a reduced threaded portion 136 forming a shoulder 137. The upper portion of the rod member is bored out at 138 connecting with slotted portion 139. Openings 140 are provided to receive a cotter pin 141. The pin member comprises a curved plate 142 having an enlarged portion 143 fitting within the bored portion 138. The plate portion 142 is received in slotted portion 139. An opening 144 receives the cotter pin 141. The rod 135 is freely slidable within the tube 133 and is held therein by a washer 145 and nut 146. A spring 147 between the shoulder 137 and the washer 145 which washer bears against the lower end of tube 133 serves to urge the stop member outwardly but permits inward movement against the action of the spring, as clearly seen in Figure 9. The plate 42 rides in the slot 134 and bears against the lower extremity of the slot to limit the inner movement of the stop. It will be clear from Figure 9, that the right hand side of the stop will bear against the edge of the fixed pipe and will limit insertion of the clamp to the proper position. The shape of plate 142 is such as to permit the stabbing pipe to press against the curved edge of the plate and as the pipe is being stabbed home, the stops will retract until the two edges of the pipe sections are adjacent each other and in position for the subsequent welding operation.

The machine includes means for swabbing the lower surface of the pipe as the machine is moved along. This swabbing means comprises a brush 148 mounted on a suitable bracket 149 carried by a plate 150 fixed to the stationary section 26. A bolt 151 connects the bracket 149 to the plate through a slot 152 to permit limited adjustment of the brush.

Figures 9, 10, 11:
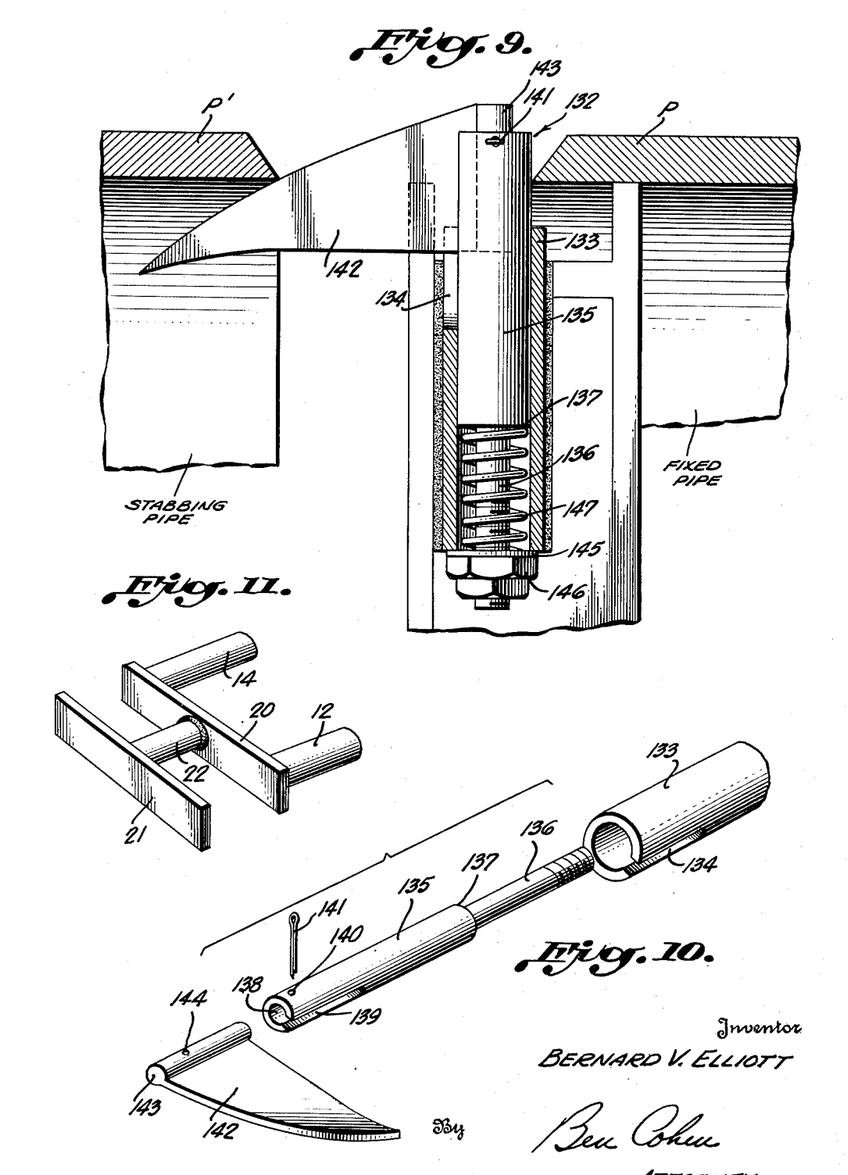
Figure 9 is an enlarged detail view of the clamp stops taken on the line 9—9 of Figure 4.
Figure 10 is an expanded view of the stop mechanism.
Figure 11 is a detail perspective view of a portion of the frame.

The operation of the present machine is as follows:

With the back line section of the pipe in place, the machine is inserted in this section until the stops 132 abut against the free edge of the section. At this point, the right half of the clamp sections as viewed in Figure 9, has penetrated to its allotted or proper depth within the fixed pipe section, the other half of the clamp sections being thus positioned for the reception of the new pipe section which is to be welded to the fixed pipe section. As the new pipe section is stabbed into position, the bullet-like nose of the stabbing shield will guide the section into proper position until it abuts the fixed pipe section. During this movement, the forward edge of the new pipe section will engage the upper curved edge of the plates 142 as seen in Figure 9, forcing the stop members inwardly against the action of the springs 147 until the edges of the pipe section abut. At this point, the upper surface of member 143 bears against the inner surface of pipe section P' thus holding the clamp from shifting. It will be clear that the two stop members are connected to the stationary section of the clamp as seen in Figure 4 and not at the top of the clamp as appears in Figure 9 which is shown for illustrative purposes as being at the top.

As the pipe section being stabbed is moved into position, the panel member and pipe 121 pass through this section. After the joint is stabbed, the self propelled generator G is moved up to the back end of this latter pipe section and the short cable 119 plugged in. The switch member 118 is then thrown to operate the motor to expand the clamp sections into tight engagement with the two pipe sections. The two sections are now in proper form for the welding operation. Upon completion of the welding step, the switch member 118 is reversed which reverses the motor 58 causing retraction of the clamp sections. The short cable is then removed from the generator and the long cable 120 plugged in. Switch 117 is then operated which operates the propelling motor 102 which propels the clamp towards the open end of pipe section P'. The use of the long cable eliminates the need of moving the generator while the clamp is being moved along the new pipe section. As soon as the front end of the clamp is free of the pipe section just joined, the motor is turned off. At this point the stop members are free of the inner surface of the pipe and can expand to their normal position. The operation is then repeated for a new section of pipe.

Thus it will be seen that the present device eliminates a great deal of manual labor and greatly speeds up the laying of pipe lines. While the foregoing specification describes and the drawings illustrate a preferred and practical embodiment of the invention, minor changes may be made in the design and construction of the present machine without departing from the spirit of the invention. Therefore, I do not wish to be limited precisely to the particular construction herein shown except as may be required by the appended claims considered with reference to the prior art.

Having thus described the invention, what is claimed is:

1. A portable line-up clamp for aligning and clamping adjacent pipe sections, comprising a frame member, a split clamping ring mounted thereon and expandable into contact with the inner surfaces of said adjacent pipe sections, means for expanding said clamping ring, rollers rigidly mounted at the lower end of the frame for bearing against the lower inner surface of a pipe section, additional rollers resiliently mounted on the frame for contacting the upper inner surface of the pipe thereby urging the rigidly mounted rollers into contact with the lower pipe surface, and an electric motor mounted on said frame for operating said rigidly mounted rollers.

2. A portable line-up clamp as defined in claim 1, wherein said expanding means comprises an electric motor mounted on the frame for operating the split clamping ring.

3. A portable line-up clamp for aligning and clamping adjacent pipe sections comprising a frame member, an expanding head mounted on said frame member, said expanding head comprising a stationary shoe and expansible shoes operatively mounted on said stationary shoe, means for expanding said expansible shoes, rollers rigidly mounted at the lower end of the frame member for bearing against the lower inner surface of a pipe section, additional rollers resiliently mounted on said frame member for contacting the upper inner surface of the pipe thereby urging the rigidly mounted rollers into contact with the lower pipe surface, and an electric motor mounted on said frame member for operating said rigidly mounted rollers.

4. A portable line-up clamp as defined in claim 3, wherein said expanding means comprises an electric motor mounted on the frame for operating the expansible shoes.

5. A portable line-up clamp as defined in claim 3, spacer members mounted on said expanding head between the stationary shoe member and the expansible shoe members, said spacer members having a portion adapted to abut an edge of a pipe upon insertion of the clamp within the pipe, said spacer members being mounted for retractible movement.

6. A portable line-up clamp as defined in claim 3, and a stabbing shield carried by each shoe, said stabbing shield comprising an inwardly curved open framework.

BERNARD V. ELLIOTT.

REFERENCES CITED

The following references are of record in the file of this patent:

UNITED STATES PATENTS

| Number | Name | Date |
|---|---|---|
| 504,181 | Stanley | Aug. 29, 1893 |
| 963,603 | Lunceford | July 5, 1910 |
| 1,073,184 | Trent | Sept. 16, 1913 |
| 1,333,491 | Hughes | Mar. 9, 1920 |
| 1,962,351 | Kane | July 12, 1934 |
| 2,040,785 | Esch | May 12, 1936 |
| 2,083,834 | Galuppo | June 15, 1937 |
| 2,167,388 | Murcell | July 25, 1939 |
| 2,167,886 | Graham | Aug. 1, 1939 |
| 2,353,863 | Bisbee | July 18, 1944 |
| 2,408,255 | Elliott | Sept. 24, 1946 |
| 2,413,103 | Forbes | Dec. 24, 1946 |
| 2,429,053 | Forbes | Oct. 14, 1947 |